UNITED STATES PATENT OFFICE.

THOMAS H. ROBINSON, OF LONDON, ONTARIO, CANADA.

LAXATIVE BREAKFAST FOOD.

1,261,057.     Specification of Letters Patent.     Patented Apr. 2, 1918.

No Drawing.     Application filed June 27, 1917. Serial No. 177,412.

*To all whom it may concern:*

Be it known that I, THOMAS H. ROBINSON, a subject of the King of Great Britain, and a resident of the city of London, in the county of Middlesex, in the Province of Ontario, Canada, have invented a new and useful Laxative Breakfast Food, of which the following is a specification.

This invention relates to new and useful improvements in laxative breakfast food.

The primary object of the invention is the provision of cereal breakfast food having natural laxative properties and being prepared substantially ready for use by the customer.

A still further object of the device is the provision of a breakfast food especially adapted for persons having indigestion and ordinarily requiring the taking of purgative medicines and whereby the necessary natural laxative is furnished with the food, obviating the necessity of resorting to the use of drugs.

A still further object is to provide a breakfast food that is wholesome and nutritious in its effects upon the human system being composed of a combination of previously cooked cereals, the same being easily digested and having further medicinal properties furnishing the necessary laxative for not only the cereal itself, but also the entire meal accompanying the same.

With these general objects in view, the present invention consists in preparing a desirable cereal in a certain manner in its cooked state and then mixing the same with the cooked bran and to which may be added suitable seasoning ingredients.

The preferred ingredients employed in compounding the present food consists of first preparing corn by steam cooking the same in juice which has been extracted from barley and then combining wheat bran therewith which has been previously steam cooked and then dried and toasted, or dry cooked as desired, while sugar and salt are then preferably mixed therewith.

It is not desired to limit my invention to the use of the two cereals mentioned, corn and bran, nor the employment of a liquid extracted from barley but these are herein set forth as preferable while other cereals and cereal extracts may be employed without departing from the spirit and scope of my present invention as hereinafter claimed. I also prefer to sweeten the present food with sugar and to season the same with salt although these ingredients may be omitted if desired and added by the user of the food to suit the taste, while other sweetening and seasoning mediums may be employed for a similar purpose if found desirable.

The following percentages of ingredients have been found advantageous in compounding the present food for rendering the same suitably laxative and highly nutritive:—

Corn 39%, bran 39%, barley extract or liquid 20%, sugar 1% and salt 1%. These ingredients are compounded with the said relative percentages by weight, although the same percentages by bulk may be advantageously employed.

It will be understood that the corn cooked as herein set forth may be of any variety and may be suitably mealed if desired while bran such as wheat bran assists in furnishing the laxative as well as nutritive properties to the cereal and which is further assisted by the liquid extracted from another cereal such as barley and mixed as an ingredient of the compounded food.

What I claim as new is:—

1. A food comprising corn steam cooked in juice extracted from barley and combined with another cooked grain ingredient.

2. A food compound formed by steam cooking corn in barley juice and then combining therewith toasted cooked wheat bran.

3. A food formed by steam cooking corn in the extract from barley, with salt and sugar and mixing therewith toasted steam cooked wheat bran.

4. A food comprising corn 39%, bran 39%, liquid extracted from barley 20%, sugar 1% and salt 1%.

In testimony whereof, I have signed in the presence of the two undersigned witnesses.

THOMAS H. ROBINSON.

Witnesses:
    P. J. EDMUNDS,
    M. A. EDMUNDS.